Jan. 16, 1968   R. D. MONTGOMERY   3,363,389
LOCK BAR STRUCTURE
Filed April 22, 1965   3 Sheets-Sheet 1
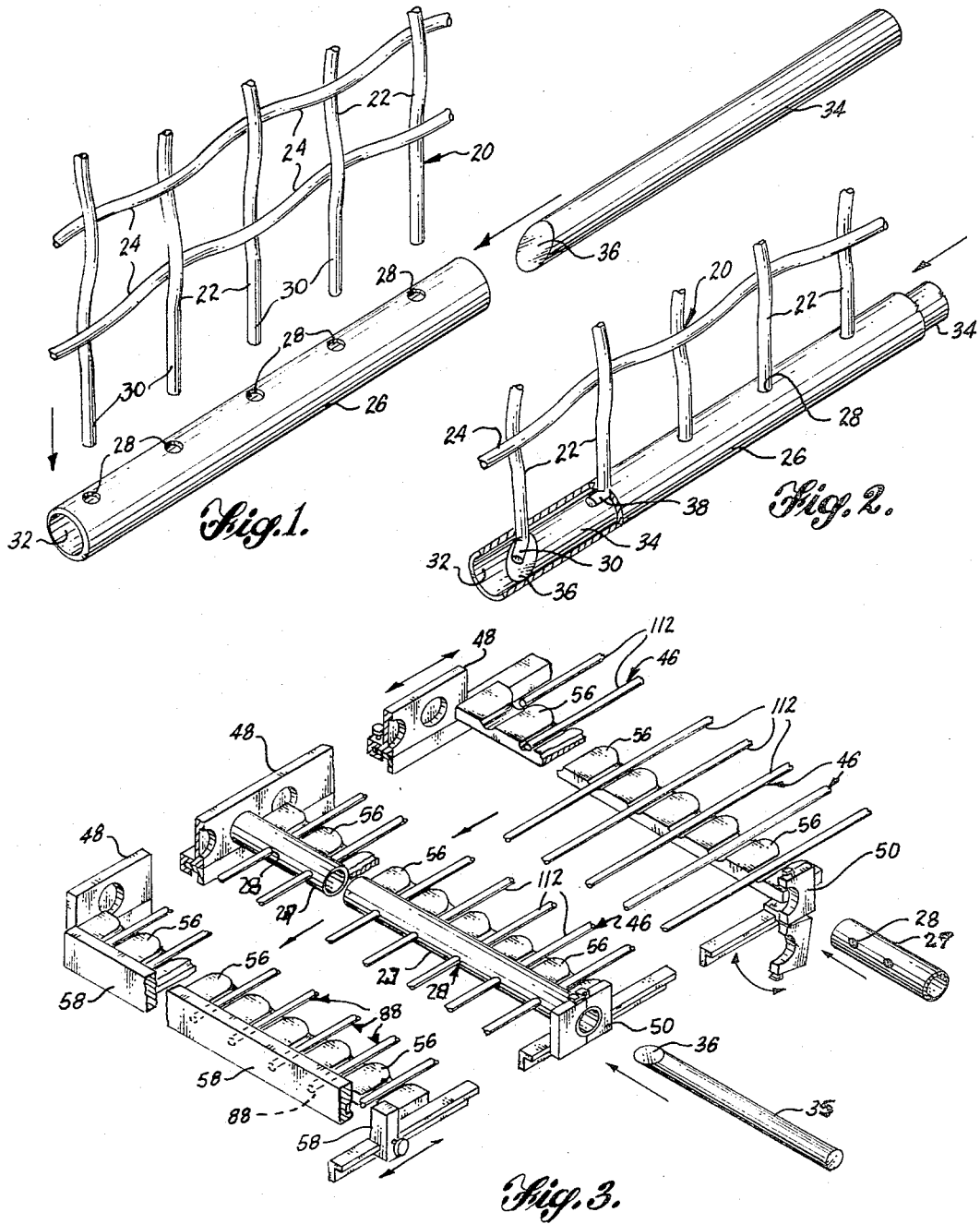
INVENTOR.
R. D. MONTGOMERY
BY
ATTORNEY

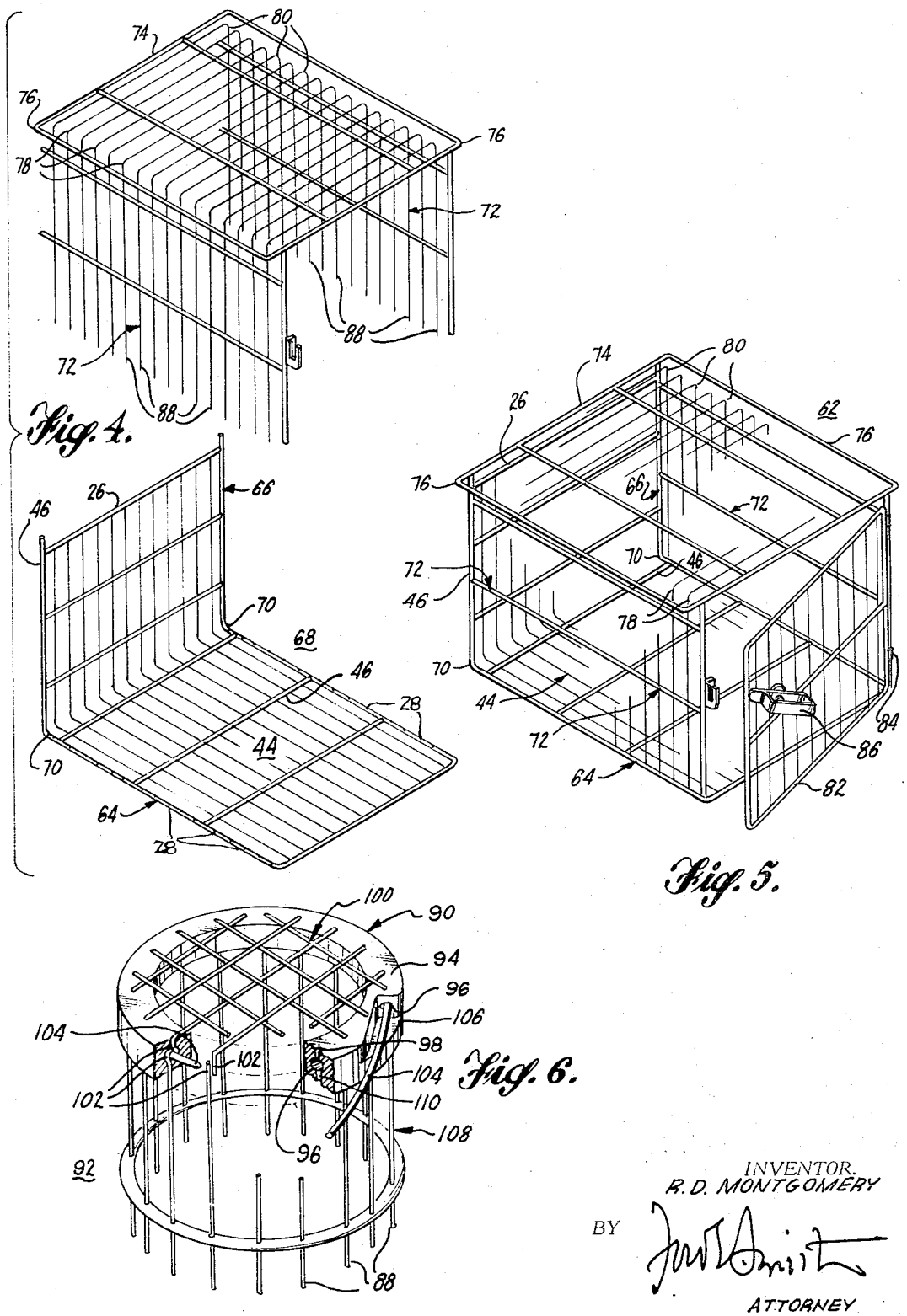

United States Patent Office 3,363,389
Patented Jan. 16, 1968

3,363,389
LOCK BAR STRUCTURE
Robert D. Montgomery, 7321 49th NE.,
Seattle, Wash. 98105
Filed Apr. 22, 1965, Ser. No. 450,052
4 Claims. (Cl. 52—656)

ABSTRACT OF THE DISCLOSURE

Structural panels of openwork comprising a series of bars each inserted into a matching transverse aperture of a tubular reinforcement and being there secured by a lock bar, longitudinally inserted into the tubular member, deflecting and holding the bars in a tensed relationship, thereby preventing their withdrawal from the reinforcement member.

---

This invention relates to structural panels and methods of making them. These panels may be used, for example, in structures that separate and define spaces for such purposes as the storage, handling and/or processing of goods; for controlling animals; for guiding persons; and for numerous related uses. Moreover these materials, metallic, non-metallic, and combinations thereof, are useful in all the various ways attributable to structural materials referred to by the following terms, such as: grille, grid, grating, woven wire, welded wire, openwork barrier, expanded metal, hardware cloth, wire mesh, fencing and screening.

This invention also relates to more complex structures wherein at least a portion thereof is composed of a structural panel which provides an openwork structure.

A main purpose of this invention has been the provision of better components for such openwork structural materials and new methods to make the components and to assemble them. In attaining this purpose by practicing the invention, there has been the objective of providing improved connecting methods and the resulting mechanical joints themselves.

The openwork structures of this invention are made strong, resistant to forces, durable, and yet are simple in regard to their preparation and mechanical connection into a structural unit.

The invention, as illustrated in the main embodiment, has few structural components. There is a hollow member referred to as a reinforcement, edge support, or frame. To this hollow member usually throughout its length, rod or wire ends of an openwork structure are passed through a line of apertures into the hollow interior and joined to it. This reinforcement in most instances is uniform in cross-section throughout its length particularly as to the hollow interior. Other forms such as cones, wedges and the like may also be employed. The spaced apertures provide access to the hollow interior of the reinforcement for joining openwork structures to it.

The openwork structure, necessarily, has a margin composed of spaced apart projecting wire or rod ends that pass through or are inserted into the spaced apertures of the hollow reinforcement. The margin of projections may be a portion of an openwork panel structure or it may be on the edge of a non-openwork structure.

The other basic component of the main embodiment, is a lock bar which is insertable longitudinally into the hollow interior of the reinforcement. The lock bar contacts and creates a tensed relationship between the reinforcement and the inserted projecting portions of the panel structure by bending or deflecting the rod or wire ends relative the axes of the apertures. The lock bar installation thereby prevents withdrawal of the projections and secures the panel structure to the hollow reinforcement member to form an integrated unit of structural utility.

The invention, as illustrated in this main embodiment, has few method steps during manufacturing, which comprise:

(a) Forming a line of apertures in a hollow reinforcement member at locations which are spaced apart longitudinally, with the axis of each aperture being transversely directed in the wall of the reinforcement member;

(b) Providing a panel structure having marginal projecting elements separated as with the aperture spacing;

(c) Relatively moving the reinforcement and the panel structure to cause the projecting marginal elements each to enter an aperture and pass into hollow interior of the reinforcement; and (d) Moving an elongated bar into the hollow interior of the reinforcement to contact and deflect the projecting marginal portions into a tensed relationship, to prevent their withdrawal and consequently to secure and join the panel structure to the hollow reinforcement member.

This invention is illustrated initially in regard to these few basic components. Thereafter, the drawings show, by way of example, additional components and embodiments, and indicate other methods which are used to form useful structures. In addition, embodiments of specific modular components are illustrated. Observations of these figures and a reading of their descriptions will point out directly and clearly many possible articles or assemblies which may be manufactured using this structural material and the disclosed methods.

In these drawings, like numerals refer to like components throughout the various figures, wherein:

FIGURE 1 is an exploded perspective view of the three basic components of reinforcement; panel structure, and lock bar separated and positioned as for assembly;

FIGURE 2 is a perspective view of the components shown in FIGURE 1, after assembly, with portions broken away to show their resulting contact in a tensed relationship;

FIGURE 3 is a fragmentary perspective view, showing production fixtures for the assembly of the basic components of an embodiment of this structural material;

Figure 7:
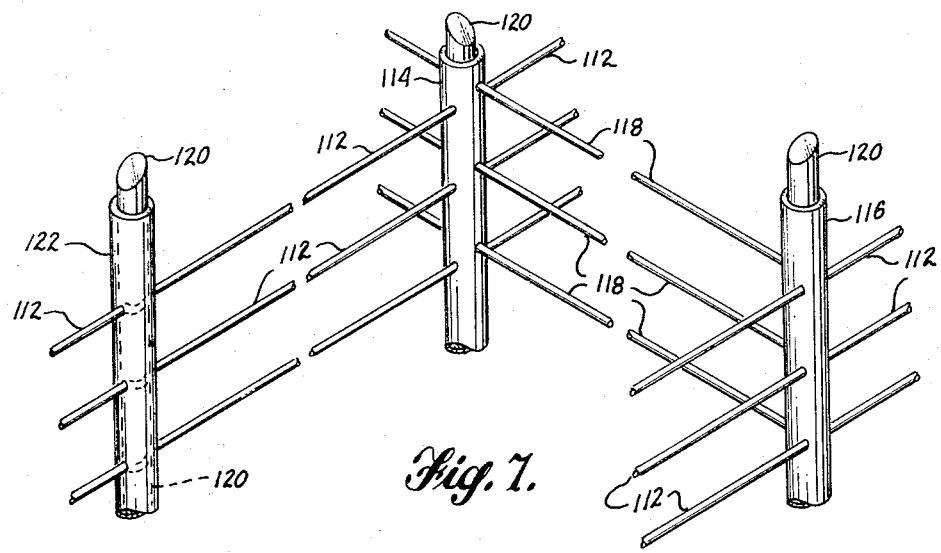
Figures 8, 9:
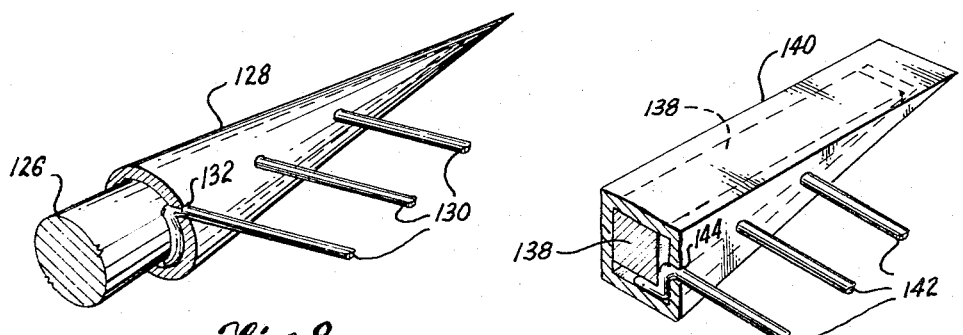

FIGURE 4, in an exploded perspective view, shows openwork structural material, as produced according to FIGURE 3 orientated for final assembly into an enclosure;

FIGURE 5 is a perspective view of the sub-assemblies of FIGURE 4 assembled into an enclosure;

FIGURE 6 is a perspective view, partially broken away, of an annular openwork structure and a cylindrical enclosure associated together;

FIGURE 7 is a perspective view of openwork structure showing various typical connections of openwork elements and frame members in intersecting, crossing or T relationships;

FIGURE 8 is a partial perspective view of a conical reinforcement and joined openwork structure;

FIGURE 9 shows a wedge-shaped reinforcement and joined openwork structure; and

Figure 10:
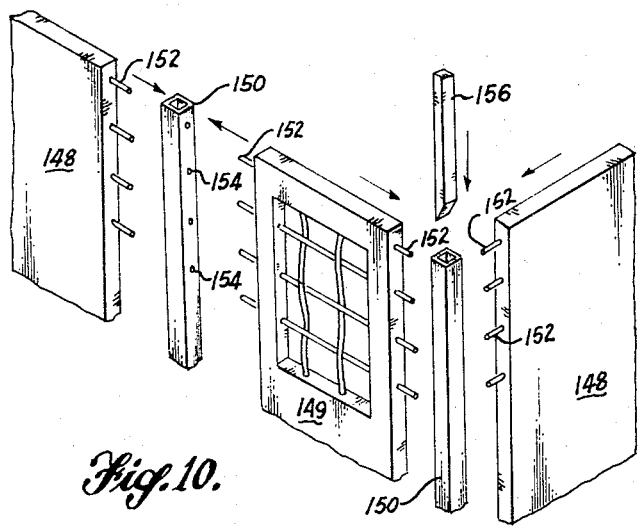

FIGURE 10 is an exploded perspective view of rectangular reinforcement elements positioned to be joined to solid or openwork panels having marginal spaced projections.

Referring to FIGURES 1 and 2, the method is illustrated of joining an openwork panel or grid 20, having interwoven vertical wires 22 and horizontal wires 24, to a hollow reinforcement, frame, or edge support 26. Transverse apertures 28 are made in the wall of hollow reinforcement 26 at proper spacing to receive projecting ends 30 of the openwork material 20. As illustrated in FIGURE 1, such ends 30 are the terminals of vertical wires 22 extending beyond the marginal horizontal wire 24 and which will lie adjacent the edge support 26.

After alignment of projecting ends 30 and apertures 28, relative movement results in wire ends 30 being disposed within interior 32 of reinforcement 26. With openwork 20 and reinforcement 26 thus assembled, lock bar 34, of less cross-sectional area than interior 32, is moved longitudinally of reinforcement 26. The inserted end of lock bar 34 has a sloping cam 36. Projecting ends 30 within interior 32 are contacted by bar 34 in a tensed relationship, are deflected or are bent at their extreme ends 38. The relative sizes and strengths of reinforcement 26, projecting ends 30 and lock bar 34 govern this action.

Upon insertion of lock bar 34, the structure illustrated in FIGURE 2 is obtained. The terminal ends of horizontal wires 24, in like manner, can be secured in another reinforcement disposed angularly to member 26 to continue framing of the structure. Eventually, reinforcements 26 used with openwork 20 can comprise a useful structure such as indicated in FIGURE 5, which illustrates, however, a slightly different embodiment of openwork material in which the grid is not interwoven as in FIGURES 1 and 2.

Openwork material 44 shown in FIGURE 4 is based on spaced parallel rods 46 which pass through opposed and aligned transverse apertures 28 in reinforcements 27. Such openwork material 44 may be assembled by utilizing tooling and mechanisms illustrated in FIGURE 3. Portions have been broken away for clarity and to indicate the fabrication of an elongated element. At spaced intervals, hollow reinforcement 27 has opposed transverse apertures 28. Member 27 is held in position by end positioner 48 to the left and by clamp-positioner 50 in the near foreground. Rods 46 may be moved through guide means including notch guides 56. Rods 46 pass through apertures 28 of reinforcement 27 until their leading ends abut stop bar 58 to become projecting ends 88. Then a lock bar 35 is moved into reinforcement 27 to contact rods 46 deflecting and tensing them thereby securing rods 46 to reinforcement 27. Obviously an assembly including several reinforcement members 27 can be simultaneously fabricated.

This assembly apparatus and method illustrated in FIGURE 3 may be arranged to fabricate various sized modules or lengths of openwork structure on a somewhat continuous basis. The modules may be packaged in sheets or rolls for sale and distribution to custom shops in much the same manner that welded wire and other products are sold in incomplete form.

The composite perspective view of FIGURE 4 and the resulting assembly view of FIGURE 5 show how an openwork L-shaped element 44 may be coupled to an inverted U-shaped element to enclose space or define an enclosure 62. Such a product may be used as a cage to house medical research animals. A preferred pre-assembly is indicated below in FIGURE 4 where openwork bottom 64 and openwork back 66 are fabricated as one element involving a bend at 70. Sides 72, 72 and top 74 form the upper U-shaped pre-assembly there being two beads 78 and 80 involved. A front panel 82 is also pre-assembled and may serve as a door 82 when joined by hinges 84 and secured by a latch 86. Rails 76 overhang the sides 72 and are useful to suspend the cage as in a rack 30 where a group of cages may be brought together into a battery.

The finally assembled closure of FIGURE 5 indicates the advantages of using these pre-assemblies of openwork elements. Most of the structural connections are mechanical, the lock bars 34 holding projecting rod ends 88 of the openwork material 44 in a tensed relationship relative to reinforcements 27 which receive them through their transverse apertures 28 located about their circumference as necessary.

The requirement for welded joints is held to a minimum in most products. Generally such a welding requirement only results when special features are involved such as the provision of overhanging rails 76 which are provided to slidably interfit with large racks (not shown) which may support many enclosures 82.

Openwork structures are also formed in curved or annular sub-assemblies and assemblies, as indicated in FIGURE 6. The end 90 of cylindrical container 92 is formed to include a circular outer frame 94 which has an interior recess 96. Spaced about frame 94 are apertures 98 intersecting and providing access to recess 96. Openwork material 100 is formed of wires or rods having projecting ends 102 cut and pre-bent to a circular pattern to match the placement of apertures 98. Upon insertion of ends 102 into apertures 98 and recess 96, openwork 100 is held in place by lock bar 104 which is passed around in recess 96 to hold the bar ends 102 in place in a tensed relationship. An adit groove 106 is provided to lead lock bar 104 into passage 96. The cylindrical openwork portion 108 of container 92 also has projecting ends inserted upward through apertures 110, misaligned with apertures 98, into recess 96 to be also gripped by lock bar 104. A separate recess and lock bar may be used to join the cylindrical openwork portion 108 to the end frame 94.

Schematically indicated in FIGURE 7 are openwork rod or wire members joined to reinforcement elements by mechanical attachment methods according to this invention. The resulting products are adaptable to fencing, partitioning, dividers or enclosures wherein the openwork may terminate, continue on, and/or be approached by another openwork panel from an angle. Reinforcement 122 has continuous rods 112 passing through it in a straight line. Reinforcement 114 has continuous rods 112 passing through it in two directions. Reinforcement 116, has continuous rods 112 passing through in one direction and rod ends 118 terminating within it. At all locations lock bars 120 are used to hold the rods in position in a tensed relationship relative the reinforcement tubes to which they are joined.

Decreasing cross-sectional area reinforcements used in mechanical lock bars structures are illustrated in FIGURES 8 and 9. In FIGURE 8 a conical lock bar 126 is inserted into a conical reinforcement 128 to hold rods 130 in a tensed relationship, after their ends are inserted through apertures 132. In FIGURE 9 a tapered or wedge-shaped lock bar 138 is inserted into tapered reinforcement member 140 to hold rods 142 in a tensed relationship when their ends are inserted through apertures 144.

To further illustrate the versatility of these lock bar structures, combined openwork and solid panel construction is illustrated in FIGURE 10. Also indicated is the utilization of rectangular or square hollow reinforcements 150 which receive projecting ends 152 through their apertures 154. Solid panels 148 and openwork panel 149 are coupled to reinforcements 150 to hold ends 152 in a tensed relationship thereby making an excellent mechanical connection.

Throughout these figures of the drawings and descriptions accompanying them, both the consistency and advantage of lock bar construction are to be recognized. Major assembly of openwork materials and their incorporation with other structures is essentially accomplished by mechanical means which are very reliable and which may be used at much lower cost when compared, for example, with welding or any other methods. Also, many materials which cannot be welded and many other materials which are not metallic may be quickly assembled following these lock bar structural procedures and principles.

The aesthetics of the disclosed lock bar structures are very substantial. Where sanitation is important, lock bar mechanical joining as here coupled with sealed joints at aperture entrances, reduces the number of places where foreign materials can collect. Severe sanitation problems and costly cleaning procedures are avoided.

As noted previously, lock bar structures serve well as confining enclosures for research animals. These enclosures are neat in appearance, easy to clean and present no structural joints, which could injure animals through abrasion of their skin or otherwise. The principles shown herein also may be employed to fabricate racks and trays for kitchen, hospital and other uses.

Although some new structural shapes have been indicated, the invention, nevertheless, may be widely practiced using currently available materials inclusive of the many openwork structures previously noted. Moreover, some of the fabrication methods indicated, which are based on resulting new openwork materials, offer substantial savings in initial production and in later assembly. Also, such new openwork material initially has reinforcements included as part of each module, making its subsequent incorporation in overall openwork structures more convenient and less costly.

It will be apparent to those skilled in metal working that the invention herein may without the exercise of more than normal skill be applied in many ways to produce openwork elements and then space-enclosing structures formed by assembling several such elements. The examples disclosed herein are typical. It is intended that all structures that fairly are equivalent to and fall within the scope of the subjoined claims be covered hereby, as also are the method features.

What is claimed is:

1. In openwork structural panels, an improvement in joining openwork materials to reinforcements, comprising:
   an integral wall tubular reinforcement member having a series of spaced apertures arranged in a line along a side of and transverse to the axis of said tubular member;
   an openwork panel having spaced apart bars passing through the spaced apertures into the central opening of the tubular reinforcement member;
   each said aperture having a uniform cross-section of substantially the same shape and size as the cross-section of the bar introduced therethrough; and
   a lock bar inserted into the axial opening in the tubular reinforcement member deflecting and holding, in a tensed relationship, the inserted bars of the openwork material, thereby preventing their withdrawal.

2. The structure according to claim 1 in which there are opposed lines of matching apertures along opposite sides of the tubular member, and the bars pass through pairs of said matched apertures.

3. The structure according to claim 1 in which the openwork material is a screen panel including marginal projections constituting said bars.

4. The structure according to claim 1 in which the reinforcement member is a curve and the apertures therein are disposed in a conforming arcuate line; the bars of the openwork panel having their ends turned at right angles and introduced into said apertures.

References Cited

UNITED STATES PATENTS

| | | | |
|---|---|---|---|
| 223,340 | 1/1880 | Grebner | 52—664 |
| 2,642,952 | 6/1953 | Landgraf | 29—160 X |
| 2,849,943 | 9/1958 | Zurawski | 29—160 X |

FOREIGN PATENTS

| | | |
|---|---|---|
| 14,852 | 8/1892 | Great Britain. |

BOBBY R. GAY, *Primary Examiner.*

R. D. KRAUS, *Assistant Examiner.*